(12) United States Patent
Yamada et al.

(10) Patent No.: US 10,315,587 B2
(45) Date of Patent: Jun. 11, 2019

(54) VEHICLE MEMBER

(71) Applicant: MAZDA MOTOR CORPORATION, Hiroshima (JP)

(72) Inventors: Takeshi Yamada, Hiroshima (JP); Takayuki Matsuo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 247 days.

(21) Appl. No.: 15/209,861

(22) Filed: Jul. 14, 2016

(65) Prior Publication Data

US 2017/0057424 A1 Mar. 2, 2017

(30) Foreign Application Priority Data

Aug. 25, 2015 (JP) .................. 2015-165392
Aug. 25, 2015 (JP) .................. 2015-165393
Aug. 25, 2015 (JP) .................. 2015-165394

(51) Int. Cl.
*B60R 13/00* (2006.01)
*H01Q 1/42* (2006.01)
(Continued)

(52) U.S. Cl.
CPC .......... *B60R 13/005* (2013.01); *G01S 13/931* (2013.01); *H01Q 1/3233* (2013.01); *H01Q 1/42* (2013.01); *B29C 69/001* (2013.01); *B29K 2025/08* (2013.01); *B29K 2995/0022* (2013.01); *B29K 2995/0025* (2013.01); *B29L 2031/3005* (2013.01); *B29L 2031/722* (2013.01); *G01S 7/032* (2013.01); *G01S 2007/027* (2013.01); *G01S 2013/9321* (2013.01); *G01S 2013/9325* (2013.01); *G01S 2013/9375* (2013.01)

(58) Field of Classification Search
CPC ....... B60R 13/005; H01Q 17/002; H01Q 1/06
See application file for complete search history.

(56) References Cited

U.S. PATENT DOCUMENTS 4,581,284 A * 4/1986 Eggert ................. H01Q 17/002
342/2
4,615,754 A * 10/1986 Waugh .................. B60R 13/005
156/242
(Continued)

FOREIGN PATENT DOCUMENTS

FR 2843559 A1 * 2/2004 ............. B42D 25/00
JP 2006-117048 A 5/2006
(Continued)

OTHER PUBLICATIONS

M. C. Hamilton et al., "Thin-Film Organic Polymer Phototransistors"; IEEE Transactions on Electron Devices; vol. 51, No. 6; Jun. 2004; pp. 877-885; IEEE, Piscataway, NJ, USA. (Year: 2004).*
(Continued)

*Primary Examiner* — Bernarr E Gregory
(74) *Attorney, Agent, or Firm* — Studebaker & Brackett PC

(57) ABSTRACT

A vehicle member includes: a film-shaped part that is semitransparent and has electric-wave transmittance; a glossy film disposed on a first side of the film-shaped part; and a surface member that is optically transparent, is integrated with the film-shaped part, and covers a second side of the film-shaped part.

20 Claims, 6 Drawing Sheets

(51) Int. Cl.
  *H01Q 1/32* (2006.01)
  *G01S 13/93* (2006.01)
  *G01S 7/03* (2006.01)
  *G01S 7/02* (2006.01)
  *B29C 69/00* (2006.01)
  *G01S 7/00* (2006.01)
  *B29K 25/00* (2006.01)
  *B29L 31/30* (2006.01)
  *B29L 31/00* (2006.01)

(56) References Cited

U.S. PATENT DOCUMENTS

| | | | | |
|---|---|---|---|---|
| 5,053,845 | A * | 10/1991 | Mori | H01L 29/7317 257/462 |
| 5,142,406 | A * | 8/1992 | Lampert | G02F 1/1525 359/269 |
| 5,215,811 | A * | 6/1993 | Reafler | B29C 51/14 428/212 |
| 5,380,044 | A * | 1/1995 | Aitkens | B42D 25/00 156/277 |
| 5,506,031 | A * | 4/1996 | Spain | B29C 59/04 428/142 |
| 5,518,786 | A * | 5/1996 | Johnson | B05D 1/286 428/354 |
| 5,798,170 | A * | 8/1998 | Zhang | H01L 51/0035 257/103 |
| 6,620,657 | B2 * | 9/2003 | Breen | H01L 51/0001 438/151 |
| 7,118,810 | B2 * | 10/2006 | Park | H01L 51/004 428/690 |
| 2002/0142111 | A1 | 10/2002 | Auld | B60R 13/005 428/13 |
| 2002/0150745 | A1 * | 10/2002 | Martin | B32B 27/08 428/216 |
| 2006/0083015 | A1 * | 4/2006 | Yamazaki | H01Q 1/06 362/540 |
| 2008/0024854 | A1 * | 1/2008 | Izumi | G02F 1/21 359/245 |
| 2010/0028610 | A1 | 2/2010 | Fujii et al. | |
| 2010/0062232 | A1 * | 3/2010 | Schauer | C08J 5/18 428/212 |
| 2010/0080939 | A1 * | 4/2010 | Kastrup | B60R 13/005 428/31 |
| 2011/0273356 | A1 | 11/2011 | Kawaguchi et al. | |
| 2012/0119961 | A1 * | 5/2012 | Mayer Pujadas | B60R 13/005 343/713 |
| 2012/0194819 | A1 * | 8/2012 | Varma | G01N 21/55 356/445 |
| 2013/0215271 | A1 * | 8/2013 | Lu | H04N 7/18 348/148 |
| 2014/0093665 | A1 * | 4/2014 | Horibe | B60R 13/005 428/31 |
| 2014/0125023 | A1 | 5/2014 | Cook et al. | |
| 2015/0023054 | A1 | 1/2015 | Goda et al. | |

FOREIGN PATENT DOCUMENTS

| | | | |
|---|---|---|---|
| JP | 2008-273216 A | 11/2008 | |
| JP | 2010-030215 A | 2/2010 | |
| JP | 2010-050598 A | 3/2010 | |
| JP | 2010-066152 A | 3/2010 | |
| JP | 2010-216924 A | 9/2010 | |
| JP | 2016-150497 A | 8/2016 | |
| WO | WO2007/081915 A1 * | 7/2007 | ....... B29C 45/14811 |
| WO | 2010/084733 A1 | 7/2010 | |
| WO | 2013/122025 A1 | 8/2013 | |

OTHER PUBLICATIONS

M. J. Deen et al., "Photosensitive Polymer Thin-Film FETs Based on Poly(3-octylthiophene)"; Proceedings of the IEEE; vol. 93, No. 7; Jul. 2005; pp. 1312-1320; IEEE, Piscataway, NJ, USA. (Year: 2005).*

Takayasu Arakawa, "Three Dimensional Circuit Formation on PET Film by Nanocomposite", Technology Report, Japan, Flarima Chemicals Group, 2009, No. 98 2009 Winter, pp. 1-3.

Motohiko Hamada; "[Tech Fair for People and Cars] Toray to provide a film capable of producing metallic luster without using metal"; Nikkei Automotive Technology; total 4 pages; Japan.

* cited by examiner

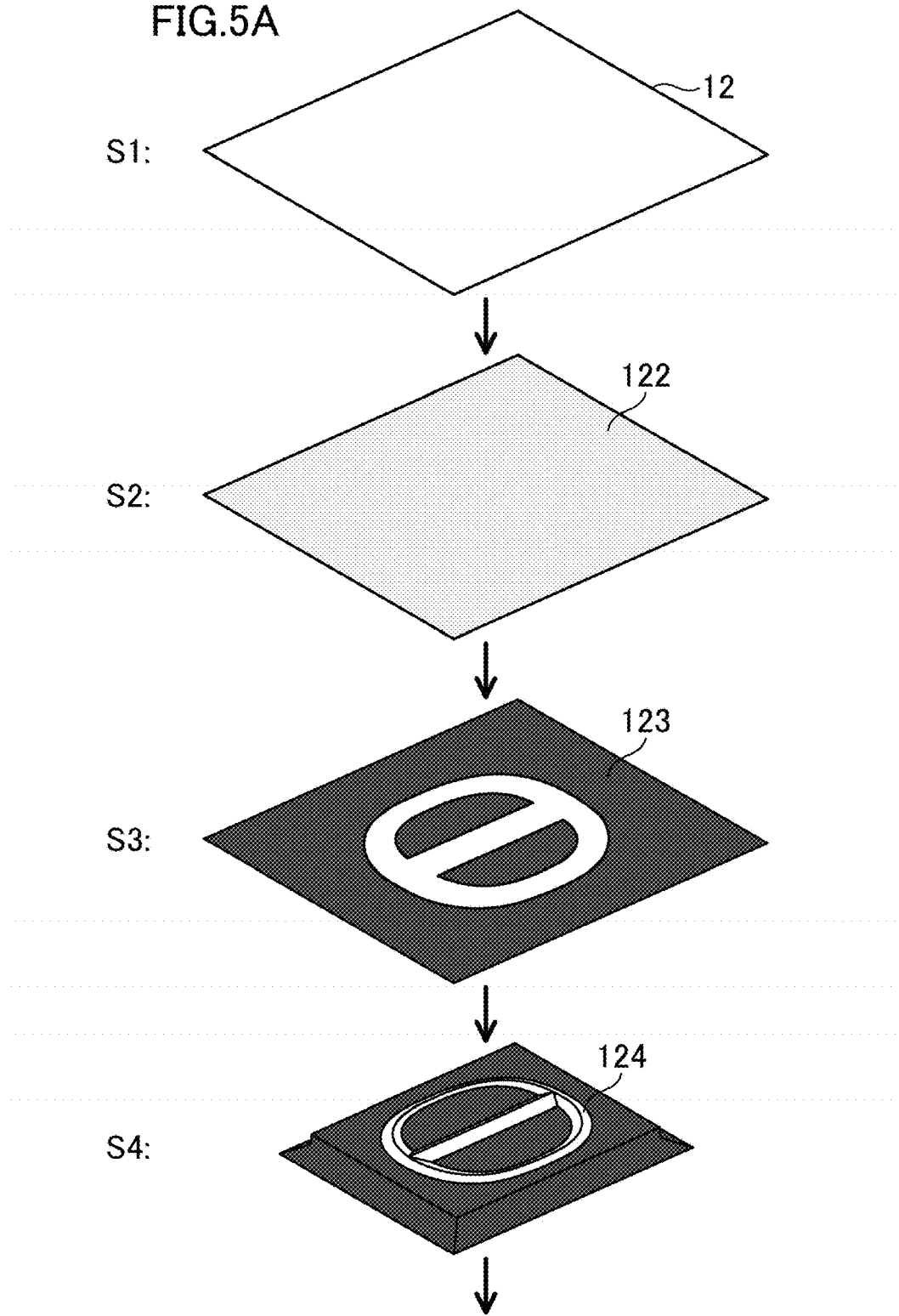

FIG.5B
S5: 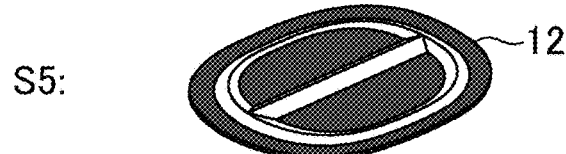
S6: 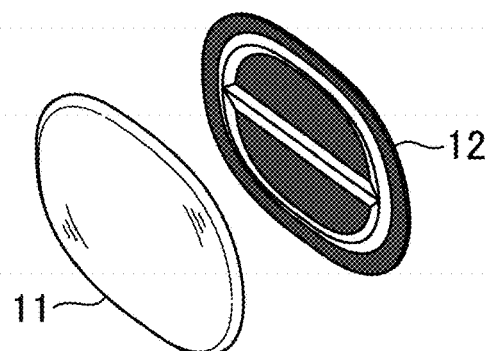
S7: 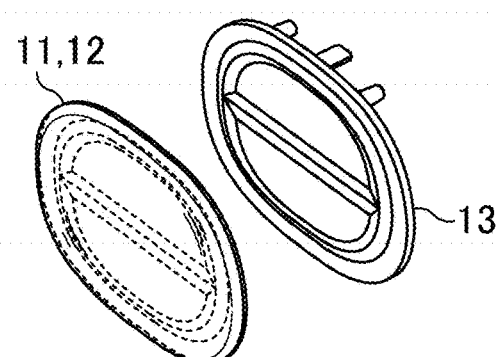
S8: 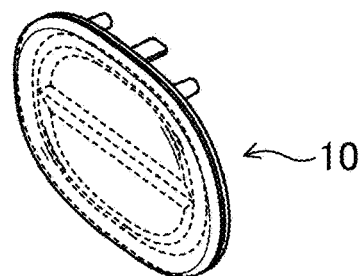

VEHICLE MEMBER

CROSS-REFERENCE TO RELATED APPLICATION

This application claims priority to Japanese Patent Applications Nos. 2015-165392 filed on Aug. 25, 2015, 2015-165393 filed on Aug. 25, 2015, and 2015-165394 filed on Aug. 25, 2015, the disclosures of which including the specifications, the drawings, and the claims are hereby incorporated by reference in their entireties.

BACKGROUND

The present disclosure relates to vehicle members, and particularly to a vehicle member suitable for, for example, an ornament of an automobile.

Recent vehicles (e.g., automobiles) are equipped with various radar systems in order to enhance safety and convenience. An example of such radar systems is a radar cruise control. A radar cruise control is a system that recognizes a speed difference and a following distance from a preceding vehicle by applying millimeter radar waves forward of the user's vehicle from a radar sensor and receiving reflected waves from the preceding vehicle so as to automatically control a travel speed of the user's vehicle.

The radar sensor is disposed at a center of a front face of the user's vehicle in consideration of directivity of the radar, especially is hidden at an inconspicuous place such as at the back of a front grille. At the center of the front face of the vehicle, however, an ornament or a front emblem indicating, for example, a corporate identity (CI) mark is often disposed. Thus, the radar sensor and the ornament overlap each other so that the surface of the radar sensor that radiates electric waves might be covered with the ornament.

The ornament is made of a metal or a material having a metallic luster in consideration of design. Ornaments using, for example, stainless steel or nickel plating, however, absorbs and diffuses electric waves incident and radiated on/from the radar sensor so that the electric waves are weakened. To solve the problem, proposed is an ornament having a metallic luster and high transmittance to electric waves by vapor-depositing indium (In) over the surface of a nonmetallic material forming a CI mark (see, for example, Japanese Unexamined Patent Publication No. 2008-273216).

Since indium is an expensive rare metal, the use of indium for an ornament increases costs for the ornament. In addition, indium has a white-silver metallic luster, and it is difficult to adjust the color tone of the white-silver metallic luster to darker or lighter. For these reasons, an ornament using indium has a monotonous color tone and has a difficulty in obtaining desired design.

SUMMARY

In view of the foregoing problems, a vehicle member suitable for an ornament of an automobile is disclosed.

In an aspect of the present disclosure, an example vehicle member includes: a film-shaped part that is semitransparent and has electric-wave transmittance; a glossy film disposed on a first side of the film-shaped part; and a surface member that is optically transparent, is integrated with the film-shaped part, and covers a second side of the film-shaped part. With this configuration, a vehicle member having desired design and high electric-wave transmittance can be obtained.

The vehicle member may further include a light-shielding film partially disposed on the second side of the film-shaped part and having a predetermined pattern. With this configuration, a portion where the light-shielding film is disposed is clearly contrasted with a portion where the light-shielding film is not disposed so that a pattern formed by the light-shielding film can be made conspicuous.

An embossed pattern may be formed on the second side of the film-shaped part, and the film-shaped part is formed so that light that has transmitted through the surface member may be reflected on the film-shaped part in different manners between a portion of the film-shaped part where the embossed pattern is formed and a portion of the film-shaped part where the embossed pattern is not formed. With this configuration, a vehicle member having desired design and high electric-wave transmittance can be obtained.

Specifically, the glossy film may have a lightness greater than 0% and less than 100%. With this configuration, the color tone of the vehicle member to be freely changed.

Specifically, the glossy film may include a printed film or a coated film. With this configuration, the glossy film can be easily formed.

Specifically, a portion where the light-shielding film is provided and a portion where the light-shielding film is not provided may have different lightnesses and/or chromas. With this configuration, design of the vehicle member can be freely changed.

Specifically, a portion of the film-shaped part on which the glossy film is disposed may have a metallic luster. With this configuration, more desired design of the vehicle member can be obtained.

Specifically, the film-shaped part may contain no metal components. With this configuration, electric-wave transmittance of the vehicle member can be further enhanced, or costs for the vehicle member can be reduced because of unnecessity for using an expensive rare metal, such as indium.

Specifically, at least a portion of the vehicle member may be disposed in an electric wave transmission/reception region of a vehicle-mounted radar device. With this configuration, the vehicle member can be used as an ornament of a vehicle in which a radar sensor is mounted at a center of a front face of the vehicle.

According to the present disclosure, a vehicle member having a design suitable for an ornament of an automobile and having high electric-wave transmittance can be obtained.

BRIEF DESCRIPTION OF THE DRAWINGS

FIG. 5A is a schematic view showing process steps in the flowchart of FIG. 4.

FIG. 5B is a view showing process steps subsequent to the process steps illustrated in FIG. 5A.

DETAILED DESCRIPTION

Figure 1:
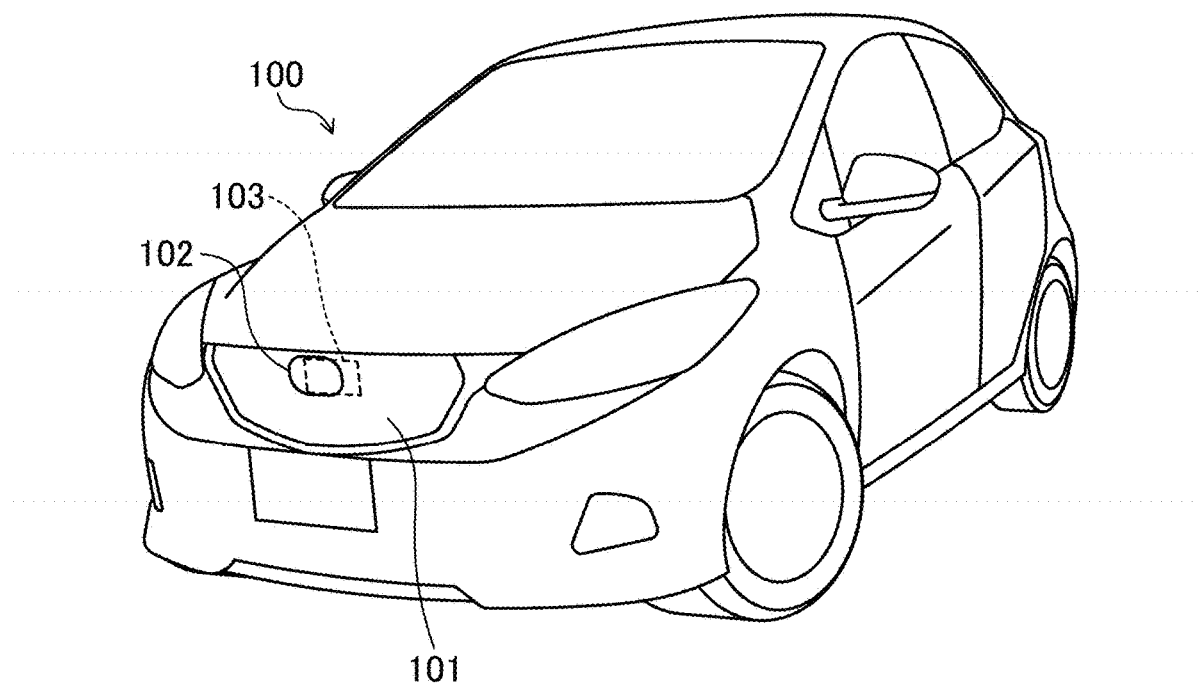
FIG. 1 is a perspective view of a vehicle including an ornament using a vehicle member according to an embodiment.

An embodiment of the present disclosure will be described in detail with reference to the drawings. Unnecessarily detailed description may be omitted. For example, well-known techniques may not be described in detail, and substantially identical configurations may not be repeatedly described. This is because of avoiding unnecessarily redundant description and easing the understanding of those skilled in the art.

Inventors of present disclosure provide the attached drawings and the following description so that those skilled in the art fully understand the present disclosure. Therefore, the drawings and the description are not intended to limit the subject matter recited in the claims. Dimensions, thicknesses, and detailed shapes of members in the drawings can be different from those actually used.

FIG. 1 is a perspective view of a vehicle including an ornament using a vehicle member according to an embodiment of the present disclosure. A front grille 101 is disposed in a front face of the vehicle 100. An ornament 102 is disposed at a center in the width direction of the front grille 101, that is, at a center in a vehicle lateral direction in the front face of the vehicle 100.

The vehicle 100 includes a radar sensor (vehicle-mounted antenna) 103 for detecting an obstacle, such as a preceding vehicle, forward of the vehicle 100. The radar sensor 103 radiates millimeter radar waves forward of the vehicle 100 and receives reflected waves from the preceding vehicle and, thereby, recognizes a speed difference and a following distance from the preceding vehicle.

The radar sensor 103 is disposed at a depth of about a dozen or so centimeters from the ornament 102. That is, the ornament 102 is disposed at a location relatively close to the surface from which the radar sensor 103 radiates electric waves, and also close to the radar sensor 103. Thus, large parts of electric waves radiated forward of the vehicle 100 from the radar sensor 103 and reflected waves from the obstacle located forward of the vehicle 100 are transmitted through the ornament 102. In view of this, to prevent electric waves incident and radiated on/from the radar sensor 103 from being absorbed and diffused in the ornament 102 and weakened, the ornament 102 needs to be made of a material having high electric-wave transmittance.

A vehicle member according to this embodiment is a member having high electric-wave transmittance and desired design, and suitable for application to noticeable vehicle exteriors such as an ornament. A configuration and a production method of a vehicle member according to this embodiment will now be described in detail.

<Configuration of Vehicle Member>

Figure 2:
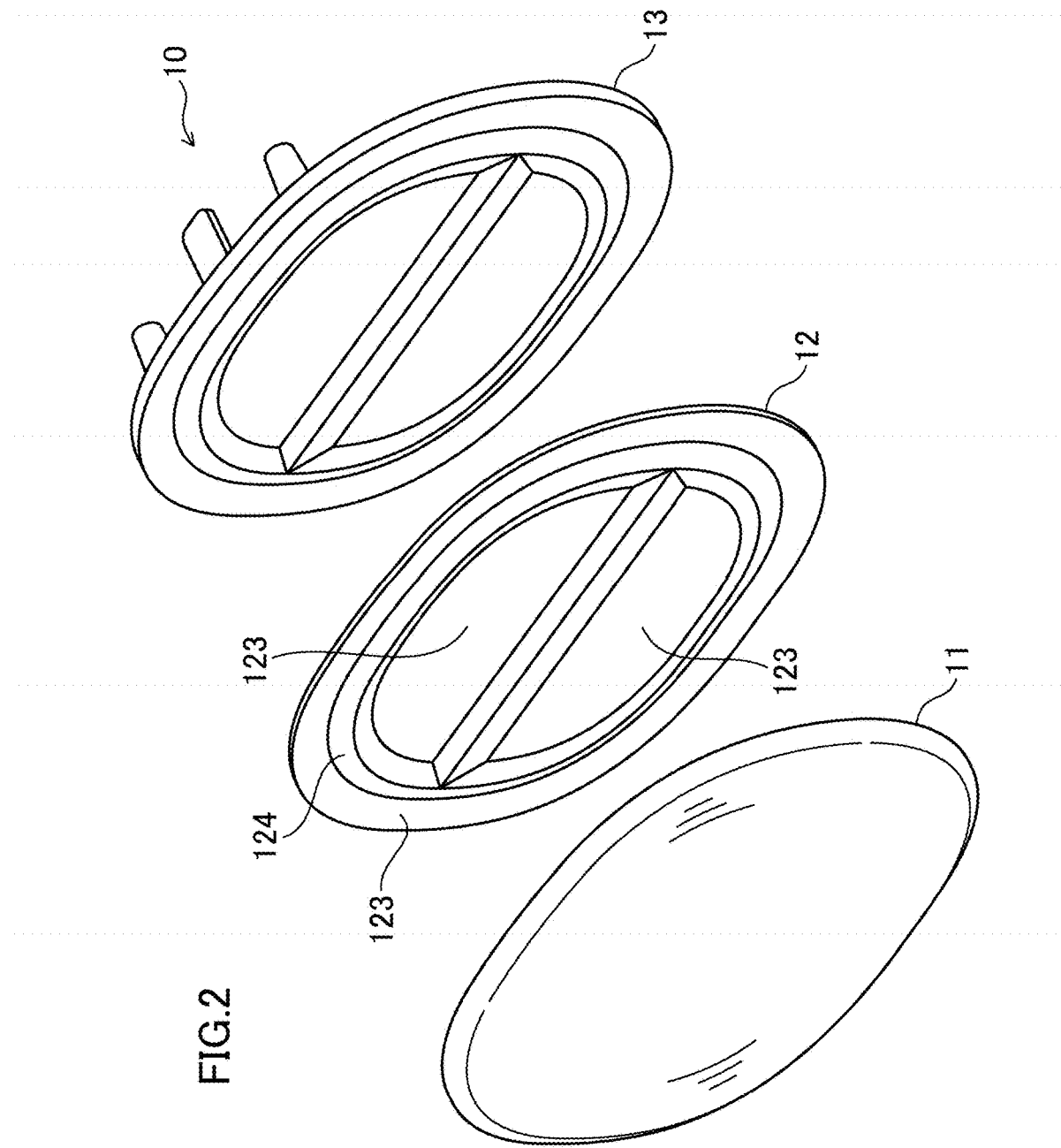
FIG. 2 is a disassembled perspective view of the vehicle member according to the embodiment.
Figure 3:
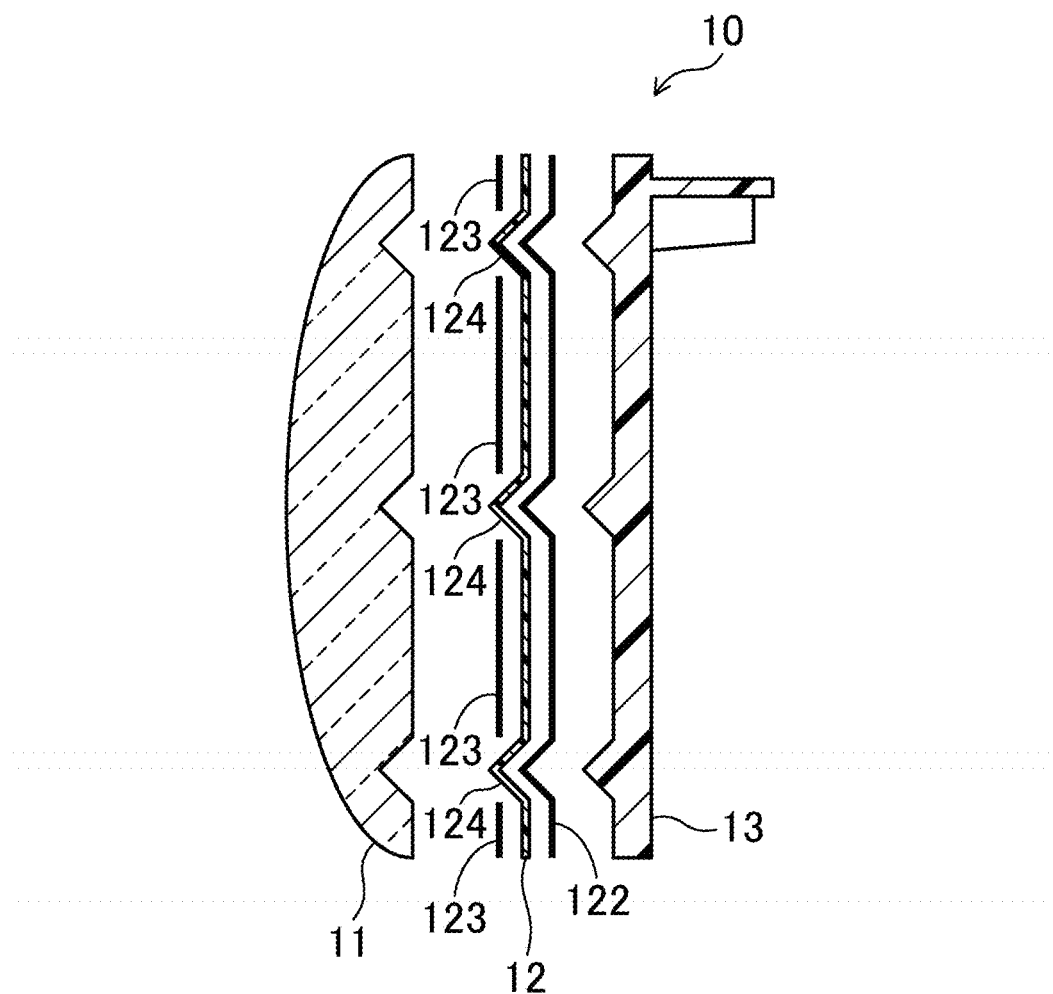
FIG. 3 is a cross-sectional view of the vehicle member illustrated in FIG. 2.

First, a configuration of a vehicle member according to this embodiment will be described. FIG. 2 is a disassembled perspective view of the vehicle member to be used for the ornament 102. FIG. 3 is a cross-sectional view of the vehicle member. As will be described later, although components of the vehicle member are in close contact with each other and integrally formed, these components are separated from each other in FIG. 3 for convenience of description.

A vehicle member 10 includes a surface member 11, a film-shaped part 12, and a base member 13. The film-shaped part 12 is sandwiched between the surface member 11 and the base member 13. The vehicle member 10 may have any overall shape. In the case of being used as the ornament 102 as illustrated in FIG. 1, for example, the vehicle member 10 may be substantially ellipsoidal.

The surface member 11 is exposed to the outside of the vehicle 100, and is provided in order to protect the outer side surface of the film-shaped part 12. The surface member 11 is made of an optically transparent material so as not to impair a luster of the film-shaped part 12, and has a smooth surface. As the surface member 11, organic glass may be used, for example. Among various types of organic glass, polycarbonate (PC) has high transparency (i.e., high light transmittance), high thermal resistance, and high impact resistance, for example, and thus, is especially preferable as a material for the surface member 11.

The surface member 11 may have any thickness. The thickness of the surface member 11 does not need to be uniform. For example, in the case of using the vehicle member 10 for the ornament 102 as illustrated in FIG. 1, the surface member 11 may have a substantially spherical surface that is thickest at the center and has its thickness gradually decrease toward the edge. In this manner, the surface member 11 does not only merely protect the film-shaped part 12 but also has a three-dimensional shape (e.g., a rounded shape) itself to have desired design.

The film-shaped part 12 is made of a semitransparent material that has electric-wave transmittance and provides special luster and texture by reflecting light in a complex manner. As such a film-shaped part 12, a film, P!CASUS (registered trademark), produced by Toray Industries, Inc. can be used, for example. This film is a stack of polymer thin films having various thicknesses in nano-level from several hundreds to several thousands, and can provide a natural metallic luster when incident light is reflected on the surfaces of these layers. In addition, the film contains no metal components, and thus, has high electric-wave transmittance.

The film-shaped part 12 is susceptible to surface scratching, and is easily damaged because of a small thickness of about 100 to 200 microns. Thus, the film-shaped part 12 is not adequate for an exterior member that is exposed to external environments. In view of this, the film-shaped part 12 is covered with the surface member 11 so that the film-shaped part 12 is not exposed to external environments.

A glossy film 122 may be formed at a back side of the film-shaped part 12. The glossy film 122 may have any thickness. The glossy film 122 has a lightness greater than 0% and less than 100%. That is, the glossy film 122 only needs to be glossy gray, and may be provided with colors and patterns when necessary. Because of the presence of the glossy film 122 at the back side of the film-shaped part 12, light transmitted from a front side of the film-shaped part 12 to the back side thereof is reflected on the front side so that a portion of the film-shaped part 12 where the glossy film 122 is formed provides a brighter metallic luster.

An appearance of the film-shaped part 12 varies by changing a gradation of lightness of the glossy film 122. For example, in a case where the glossy film 122 is pale gray, the film-shaped part 12 gives a relatively light metallic color. On the other hand, in a case where the glossy film 122 is dark gray, the film-shaped part 12 gives a relatively dark metallic color. Thus, the lightness of the glossy film 122 is suitably determined depending on a desired color tone of the film-shaped part 12.

A light-shielding film 123 may be partially formed on the front side of the film-shaped part 12 to have a predetermined pattern. The light-shielding film 123 may have any thickness. The light-shielding film 123 is literally a film that shields light, and may be of any color. For example, the light-shielding film 123 may be entirely black, or may be partially of different colors, or may have color gradation. That is, the lightness and/or chroma may be different between a portion where the light-shielding film 123 is formed and a portion where the light-shielding film 123 is not formed. In this manner, the portion where the light-shielding film 123 is formed is clearly contrasted with the other portion so that a pattern formed by the light-shielding film 123 can be made conspicuous.

The partial formation of the light-shielding film 123 on the front side of the film-shaped part 12 enables only the portion where the light-shielding film 123 is not formed gives a metallic color. For example, the light-shielding film 123 may form an inverted image of a CI mark on the front side of the film-shaped part 12 so that the front side looks as if a CI mark of a metal is attached thereto. The light-shielding film 123 may also form a CI mark on the front side of the film-shaped part 12 by using the light-shielding film 123 so that the front side looks as if a metal plate out of which a CI mark has been cut is attached thereto.

An embossed (raised) pattern 124 may be formed on the front side of the film-shaped part 12 in conformity with a pattern formed by the light-shielding film 123. In this manner, more desired design can be obtained by three dimensionally forming the pattern by the light-shielding film 123.

In the case of forming the embossed pattern 124 on the front side of the film-shaped part 12, the same embossed pattern is formed on surfaces of the surface member 11 and the base member 13 in contact with the film-shaped part 12.

Alternatively, the pattern formed by the light-shielding film 123 may not coincide with the pattern formed by the embossed pattern 124. The different patterns formed by the light-shielding film 123 and the embossed pattern 124 cause the film-shaped part 12 to provide different impressions of design.

The base member 13 is a member that supports the back side of the film-shaped part 12. As described above, since the film-shaped part 12 is a thin film-shaped member, the film-shaped part 12 is preferably protected and reinforced by sandwiching the film-shaped part 12 between the surface member 11 and the base member 13. The base member 13 may have any thickness. A projection and/or a boss, for example, may be provided on the back side of the base member 13. As the base member 13, a resin may be used, for example. Among various types of resins, especially an acrylonitrile-butadiene-styrene (ABS) resin and an acrylonitrile-ethylene-styrene (AES) resin, for example, have excellent properties such as high thermoplasticity, rigidity, and hardness, and thus, are preferable as a material for the base member 13.

<Method for Producing Vehicle Member>

Figure 4:
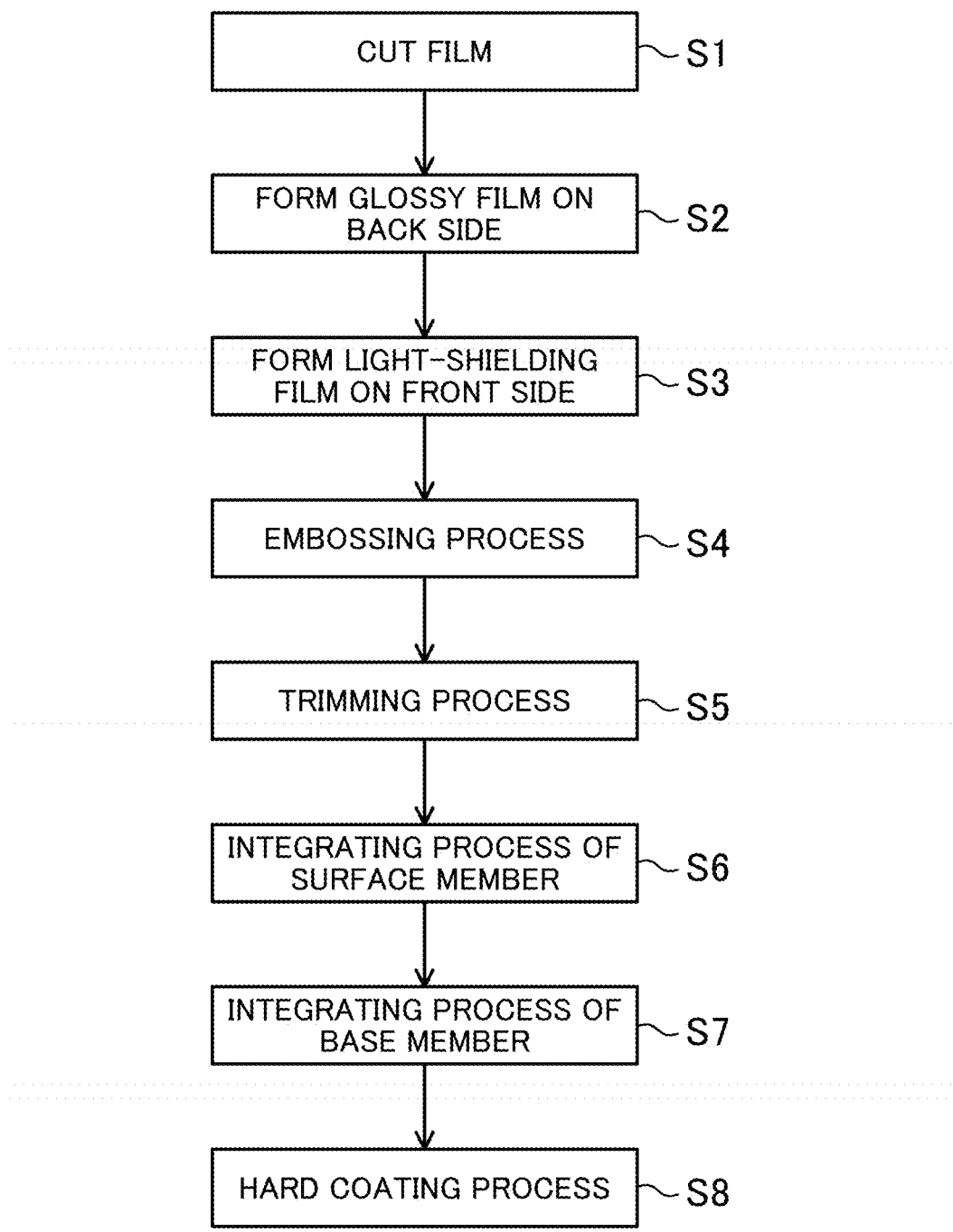
FIG. 4 is a flowchart of a method for producing a vehicle member according to the embodiment.

A method for producing a vehicle member according to this embodiment will now be described. FIG. 4 is a flowchart of a method for producing the ornament 102. FIGS. 5A and 5B are schematic views showing process steps in the flowchart of FIG. 4.

First, a film to be a film-shaped part 12 (e.g., P!CASUS produced by Toray Industries, Inc.) is cut into an appropriate size (step S1).

Next, a glossy film 122 is formed on a back side of the film (step S2). For example, the glossy film 122 can be formed by printing or coating.

Then, a light-shielding film 123 is partially formed on a front side of the film (step S3). For example, the light-shielding film 123 can be formed by printing or coating. It should be noted that the printing or coating is performed with appropriate positioning so that the light-shielding film 123 is formed at a predetermined location on the front side of the film.

The order of performing step S2 and step S3 may be reversed.

Thereafter, the film is embossed, thereby forming an embossed pattern 124 (step S4). For example, the film is heated to be softened and the resulting film is placed on a die so that the embossed pattern 124 is formed on the film surface by vacuum forming or pressure forming.

Subsequently, a trimming process for removing an unnecessary portion is performed (step S5). In this manner, a film-shaped part 12 is obtained.

Then, a surface member 11 and a film-shaped part 12 are integrally formed (step S6). For example, the film-shaped part 12 is placed on an injection molding die, and polycarbonate to be the surface member 11 is poured into the die and welded to the film-shaped part 12.

Thereafter, the integrated unit of the surface member 11 and the film-shaped part 12 and the base member 13 are integrally formed (step S7). For example, the integrated unit of the surface member 11 and the film-shaped part 12 is placed on an injection molding die, and an AES resin to be the base member 13 is poured into the die and is welded to the integrated unit of the surface member 11 and the film-shaped part 12. In this manner, a vehicle member 10 is obtained.

Lastly, a hard coating is applied on the surface of the surface member 11, thereby reinforcing the surface of the vehicle member 10 (step S8).

The embodiment has been described as an example of the technique of the present disclosure. The attached drawings and detailed description are provided for the embodiment.

Accordingly, the components shown in the attached drawings and detailed description may include unnecessary components as well as component necessary for solving the problems. Thus, these unnecessary components should not be construed as necessary component merely because of inclusion in the attached drawings and the detailed description.

While the technique of the present disclosure has been illustrated and described in the foregoing embodiment, various changes, substitutions, additions, and omissions may occur in the scope of the claims and their equivalents.

What is claimed is:

1. A vehicle member comprising:
   a film that is semitransparent and has millimeter wave transmittance;
   a coated film disposed on a first side of the film; and
   a surface member that is optically transparent, is integrated with the film, and covers a second side of the film, wherein
   an embossed pattern is formed on the second side of the film, and
   the film is formed so that light that has transmitted through the surface member is reflected on the film in different manners between a portion of the film where the embossed pattern is formed and a portion of the film where the embossed pattern is not formed.

2. The vehicle member of claim 1, wherein
   a portion of the film on which the coated film is disposed has a metallic luster.

3. The vehicle member of claim 1, wherein
   the film contains no metal components.

4. The vehicle member of claim 1, wherein
   at least a portion of the vehicle member is disposed in a millimeter wave transmission/reception region of a vehicle-mounted radar device.

5. The vehicle member of claim 1, wherein
   the coated film is a gray coated film.

6. The vehicle member of claim 1, wherein
   the film is a stack of polymer thin films.

7. A vehicle member comprising:
a film that is semitransparent and has millimeter wave transmittance, wherein the film is a stack of polymer thin films;
a coated film disposed on a first side of the film;
a surface member that is optically transparent, is integrated with the film, and covers a second side of the film; and
a light-shielding film partially disposed on the second side of the film and having a predetermined pattern.

8. The vehicle member of claim 7, wherein
a portion where the light-shielding film is provided and a portion where the light-shielding film is not provided have different lightnesses of a color and/or chromas of a color.

9. The vehicle member of claim 7, wherein
the light-shielding film includes a printed film or a coated film.

10. The vehicle member of claim 7, wherein
the film has a metallic luster.

11. The vehicle member of claim 7, wherein
the film contains no metal components.

12. The vehicle member of claim 7, wherein
at least a portion of the vehicle member is disposed in a millimeter wave transmission/reception region of a vehicle-mounted radar device.

13. A vehicle member comprising:
a film that is semitransparent and has millimeter wave transmittance;
a glossy film disposed on a first side of the film; and
a surface member that is optically transparent, is integrated with the film, and covers a second side of the film, wherein
an embossed pattern is formed on the second side of the film, and
the film is formed so that light that has transmitted through the surface member is reflected on the film in different manners between a portion of the film where the embossed pattern is formed and a portion of the film where the embossed pattern is not formed.

14. The vehicle member of claim 13, wherein
the glossy film has a lightness of a color greater than 0% and less than 100%.

15. The vehicle member of claim 13, wherein
the glossy film includes a printed film or a coated film.

16. The vehicle member of claim 13, further comprising
a light-shielding film partially disposed on the second side of the film and having a predetermined pattern.

17. The vehicle member of claim 16, wherein
a portion where the light-shielding film is provided and a portion where the light-shielding film is not provided have different lightnesses of a color and/or chromas of a color.

18. The vehicle member of claim 13, wherein
the film has a metallic luster.

19. The vehicle member of claim 13, wherein
the film contains no metal components.

20. The vehicle member of claim 13, wherein
at least a portion of the vehicle member is disposed in a millimeter wave transmission/reception region of a vehicle-mounted radar device.

* * * * *